US009229627B2

(12) United States Patent
Brusilovsky (10) Patent No.: US 9,229,627 B2
(45) Date of Patent: Jan. 5, 2016

(54) SYSTEM AND METHOD FOR GRAPHICAL RIGHTS INDICATION

(71) Applicant: General Electric Company, Schenectady, NY (US)

(72) Inventor: Mikhail Brusilovsky, Newton, MA (US)

(*) Notice: Subject to any disclaimer, the term of this patent is extended or adjusted under 35 U.S.C. 154(b) by 287 days.

(21) Appl. No.: 13/910,952

(22) Filed: Jun. 5, 2013

(65) Prior Publication Data

US 2014/0365937 A1   Dec. 11, 2014

(51) Int. Cl.
| | | |
|---|---|---|
| G06F 3/00 | (2006.01) | |
| G06F 3/0484 | (2013.01) | |
| G09G 5/02 | (2006.01) | |
| G03G 15/00 | (2006.01) | |
| G06Q 10/06 | (2012.01) | |
| G06F 11/32 | (2006.01) | |

(52) U.S. Cl.
CPC .......... *G06F 3/04847* (2013.01); *G03G 15/502* (2013.01); *G06F 11/32* (2013.01); *G06Q 10/06* (2013.01); *G09G 5/02* (2013.01)

(58) Field of Classification Search
CPC ....................................................... G09G 5/02
USPC .......................................... 715/740; 345/589
See application file for complete search history.

(56) References Cited

U.S. PATENT DOCUMENTS

| | | | |
|---|---|---|---|
| 6,282,452 B1 | 8/2001 | DeGuzman et al. | |
| 7,401,082 B2* | 7/2008 | Keene et al. | 707/785 |
| 7,714,864 B2* | 5/2010 | Cahill et al. | 345/440 |
| 8,234,477 B2* | 7/2012 | Shaath | 711/163 |
| 2002/0116418 A1 | 8/2002 | Lachhwani et al. | |
| 2004/0049294 A1 | 3/2004 | Keene et al. | |
| 2009/0307224 A1 | 12/2009 | Amin et al. | |
| 2012/0137373 A1 | 5/2012 | Miseldine et al. | |
| 2013/0321445 A1* | 12/2013 | Buerner | 345/589 |
| 2014/0095554 A1* | 4/2014 | Thomeer et al. | 707/821 |
| 2014/0104291 A1* | 4/2014 | Rutz | 345/589 |

OTHER PUBLICATIONS

PCT Search report and Written Opinion issued in connection with corresponding Application No. PCT/US2014/037757 on Sep. 23, 2014.

* cited by examiner

*Primary Examiner* — William Titcomb
(74) *Attorney, Agent, or Firm* — Fletcher Yoder, P.C.

(57) ABSTRACT

Systems and methods are provided for a non-transitory computer readable medium storing instructions configured to retrieve a first list of operations for a device including a sensor, an actuator, or a combination thereof, included in an industrial control system. The instructions are also configured to display a first color for each operation in the first list of operations indicative of a modification privilege related to the respective operation.

18 Claims, 5 Drawing Sheets

SYSTEM AND METHOD FOR GRAPHICAL RIGHTS INDICATION

BACKGROUND OF THE INVENTION

The subject matter disclosed herein relates to system and methods used in graphical user interfaces, and more particularly to rights indication in a graphic user interface.

Certain devices such as sensors, pumps, valves, and the like, may be controlled by a controller using electrical signals and may include graphical user interfaces (GUI) useful in providing control and operational indicators. For example, the controller may use a communications bus to send and receive signals to the various devices, and may graphically display information related to the devices. The controller and communications bus may be connected to a central control interface where a user can electronically interact with the devices. However, each device may have many possible operations, such as functions or parameters, that a user visually evaluates to change the operation of the device. These operations may be categorized based on importance and user-access modification privileges. These categories and privileges, however, may not adequately protect the operations due to human error, tampering, or other issues.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a non-transitory computer readable medium storing instructions is configured to retrieve a first list of operations for a device including a sensor, an actuator, or a combination thereof, included in an industrial control system. The instructions are also configured to display a first color for each operation in the first list of operations indicative of a modification privilege related to the respective operation.

In a second embodiment, a method includes retrieving a first list of operations for a device. The method also includes displaying a first color for each operation in the first list of operations indicative of a modification privilege related to the respective operation. The device includes a sensor, an actuator, or a combination thereof, included in an industrial control system.

In a third embodiment a system includes a processor configured to commission a device, derive a first list of operations for the device, and display a first color indicative of a modification privilege associated with every operation in the first list. The device comprises a sensor, an actuator, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

The disclosed embodiments employ one or more graphical representations of rights (e.g., user privileges, security levels, access rights such as viewing rights and/or execution rights, modification rights, or any combination thereof) relating to various hardware and/or software components. As discussed in detail below, the graphical representations may include a plurality of color-based representations of the rights, a plurality of image-based representations of the rights, or a combination thereof. For example, the plurality of color-based representations of the rights may include any number of color-based representations, such as 2 to 1000 colors (e.g., red, green, blue, orange, yellow, purple, black, white, etc.), each having a single color or multiple colors in combination. In other words, the color-based representations may include mono-color representations or multi-color representations, which may include various patterns or arrangements of colors (e.g., horizontal stripes, vertical stripes, diagonal stripes, concentric colors, checkerboard of colors, etc.).

The color-based representations may be displayed in a common size and a common shape, e.g., a rectangular shape with a certain pixel size, or the color-based representations may include different sizes and/or different shapes, e.g., square, rectangular, circular, oval, triangular, hexagonal, pentagonal, polygonal, or any combination thereof. Likewise, the plurality of image-based representations may include a plurality of icons, symbols, graphical art, pictorials, photos, drawings, outlines or diagrams of objects/equipment (e.g., representation of a turbine, a compressor, a pump, a motor, a sensor, an actuator, etc.), graphical representations of user types (e.g., image representing a maintenance technician, an installation technician, a software specialist, an operations specialist, etc.), or any combination thereof. For example, images of equipment and technicians may be combined to indicate certain rights, e.g., combined images of a pump and a service technician. These image-based representations may employ common colors or different colors, e.g., a combination of the color-based and image-based representations of rights. Thus, the graphical representations (e.g., color and/or image based) may visually indicate rights on a user interface, and may also facilitate user authorization to interact with the various hardware and/or software.

In operation, a computer-based system (e.g., a computer, field device, or equipment) may implement a graphical-based comparison (e.g., between a plurality of graphical representations of rights and a particular user's graphical representation of rights) to control user access and control of the hardware and/or software. For example, the computer-based system may store instructions for the comparison on memory, and execute the instructions on one or more processors. The instructions may enable a comparison of the color, the size (e.g., pixels), shape, or other characteristics of the graphical representation (e.g., color or image). For example, the instructions may compare pixels in the user's graphical representation of rights against available graphical representations of rights, the instructions may compare embedded data in the graphical representations, or any combination thereof. If the comparison indicates a match between the user's graphical representation and one of the stored graphical representations, then the instructions may grant rights to the user based on the particular matched graphical representations.

The rights may include various access levels, such as viewing access levels and execution access levels, modification levels, security levels, privilege levels, and so forth, relating to the hardware and/or software. Thus, the rights may be limited or unlimited in scope relating to particular categories of the hardware and/or software, particular types of functions (e.g., servicing, maintenance, monitoring, software updating, etc.), particular times (e.g., time of the day, days of the week, etc.), particular durations of time (e.g., unlimited or limited to durations of minutes, hours, etc.), and so forth.

The hardware components may include field devices, actuators, sensors, and various equipment, such as turbine systems (e.g., gas turbines, steam turbines, hydro turbines, and/or wind turbines), compressors, pumps, electric generators, electric motors, industrial automation systems, reactors, gasifiers, gas treatment systems (e.g., acid gas removal units, carbon capture units, etc.), water treatment systems, or any combination thereof. The software components may include firmware or other executable code (e.g., computer readable instructions), which may be stored on memory and executable on processors of the hardware components. The rights may be related to the monitoring, configuration and/or operation of these various hardware and/or software components.

The disclosed embodiments include a system and a method suitable for graphically representing a list of operations for a field device of an industrial control system. Graphical representation includes the symbols, icons, patterns, and designs described above, but the description below will specifically outline color-coding the list of operations as one type of graphical representation of the operations. As defined herein, operations for a field device include parameters used to operate the field device, such as parameters stored in field device registers, functions used to operate the field device, such as computer instructions or firmware executable by a control system or the field device, and the like. Color coding may be helpful for a user entity to more easily identify categories of operations. The list of color coded operations may be included on a display of a computing system or controller communicatively coupled to the field device. In one embodiment, the operations in the list may be assigned colors based on a modification privilege related to the operation. The modification privileges may be based on a user login, the importance of the operation, the potential for errors in executing the operation, a manufacturer recommendation, a user access level, a ranking of importance of the operation, a safety ranking of the operation, the amount of time or other resources required for the operation, business positions or roles, authorization levels, security levels, management levels, or other criteria.

In one embodiment, access levels represented by access colors may be used to provide access to modify the field device. Indeed, each operation in a list of operations may have an assigned color, which may be compared to a user-login color representing the current log-in access level of a user entity. The user entity may be granted or denied access to certain operations based on a comparison between the color assigned to the operation and the log-in color. In certain embodiments, the colors assigned to the list of operations may be assigned in a hierarchical fashion, whereby each higher color access level may have access to all the operations in a lower color access level. In other embodiments, the colors may be assigned based on other schemes whereby some operations assigned to one color are also available to another color, but not all operations assigned to the first color are available to the second color, as described in more detail below.

Figure 1:
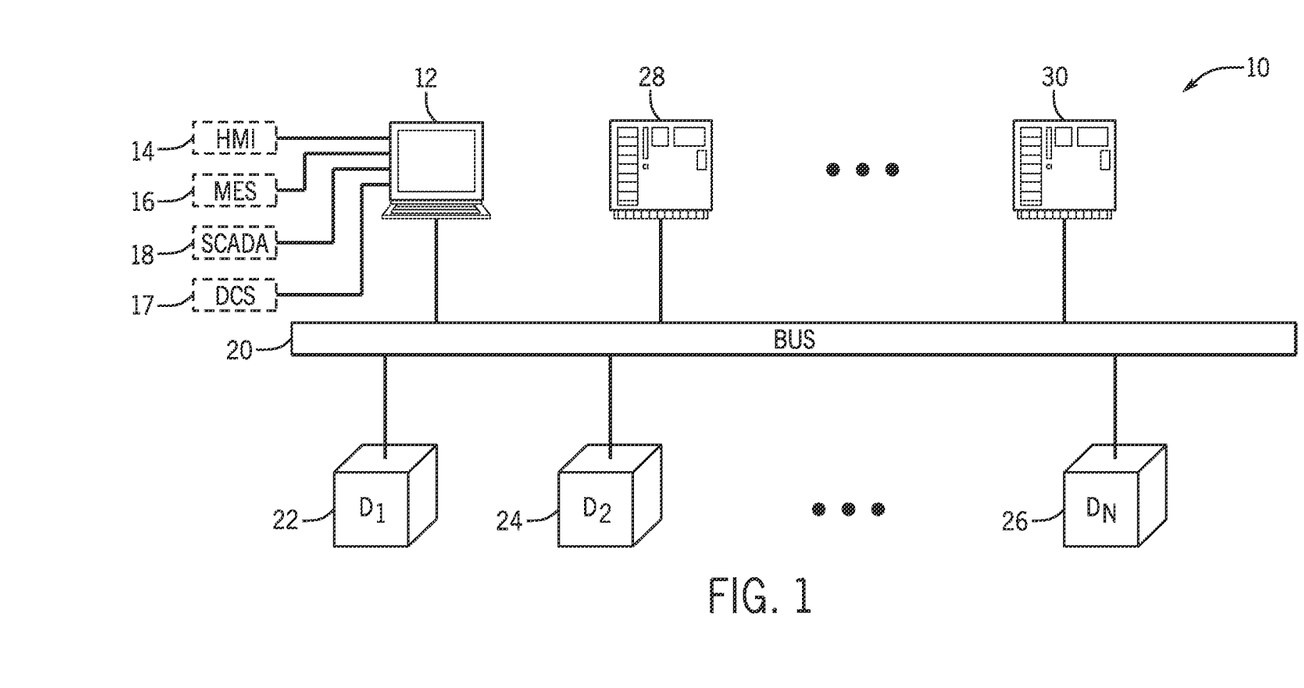
FIG. 1 is a schematic diagram of an embodiment of an industrial control system, including a communications bus.

It may be useful to describe certain systems that may advantageously use the techniques described herein. Turning to FIG. 1, an embodiment of an industrial process control system 10 is depicted. The industrial process control system 10 may be used in a number of industrial applications. Industrial applications include turbine systems (e.g., gas turbines, wind turbines, hydro turbines), power plant equipment, gasifiers, gas treatment systems, automation systems, or others. A computer 12 is suitable for executing a variety of field device configuration and monitoring applications, and provides an operator interface through which an engineer or technician may monitor the components of the industrial process control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. The computer 12 may contain non-transitory computer readable medium storing instructions to carry out the system and method described below.

In accordance with one embodiment, the computer 12 may host an industrial automation system such as a human-machine interface (HMI) system 14, a manufacturing execution system (MES) 16, a distributed computing system (DCS) 17, and/or a supervisory control and data acquisition (SCADA) system 18. Further, the computer 12 is communicatively connected to a bus 20 suitable for enabling communication between the computer 12 and devices $D_1$ 22, $D_2$ 24, and one or more devices $D_N$ 26. The bus 20 may provide for communicative functionality of one or more protocols, including but not limited to Modbus, Fieldbus Foundation™ HART®, Profibus, or a combination thereof. Accordingly, the bus 20 may include Ethernet conduits, serial conduits, and other conduits useful in communicating data. The devices 22, 24, and 26 may include field devices such as flow meters, pumps, sensors, valves, actuators, turbines, and the like, suitable for use in industrial applications. For example, the devices 22, 24, and 26 may include flow meters that measure the velocity and/or volume of fluid passing through a known area. The devices 22, 24, and 26 may additionally or alternatively include temperature meters, pressure meters, clearance (e.g., distance between stationary and rotating components) sensors, chemical sensors, pollution sensors, non-destructive inspection meters (e.g., eddy current, sonographs, optical meters), and so on. It is also to be noted that the devices 22, 24, and 26 may include devices suitable for use in residential applications, such as home automation applications. The devices 22, 24, and 26 may include industrial devices, such as Modbus devices that include support for the Modbus communications protocol available from the Modbus Organization. The devices 22, 24, and 26 may additionally or alternatively include Fieldbus Foundation™ devices that include support for the Foundation H1 bi-directional communications protocol. When commissioning a device, a user (e.g., a commissioning engineer) will update the device's memory with desired parameters including device identification, network parameters suitable for enabling communication through the plant network, and the like. The devices 22, 24, and 26 may also include support for other communication protocols, such as those included in the HART® Communications Foundation (HCF) protocol, and the Profibus Nutzer Organization e.V. (PNO) protocol.

In the depicted embodiment, two programmable logic controllers (PLCs) 28 and 30 are also connected to the bus 20. The PLCs 28 and 30 may use the bus 20 for communicating with and controlling any one of the devices 22, 24, and 26. The bus 20 may be any electronic and/or wireless bus suitable for enabling communications, and may include fiber media, twisted pair cable media, wireless communications hardware, Ethernet cable media (e.g., Cat-5, Cat-6, Cat-7), and the like. Further, the bus 20 may include several sub-buses, such as a high speed Ethernet sub-bus suitable for connecting system 10 components at communication speeds of 100 MB/sec and upwards. The bus 20 may also include an H1 network sub-bus suitable for connecting system 10 components at communications speeds of approximately 31.25 Kb/sec.

The sub-buses may intercommunicate with each other, for example, by using linking devices or gateways, such as those gateways available under the designation FG-100 provided by Softing AG, of Haar, Germany. Indeed, a number of interconnected sub-buses of the bus 20 may be used to communicate amongst the components of the system 10. It is to be noted that the industrial process control system 10 depicted in FIG. 1 is greatly simplified for purposes of illustration. The number of components is generally many times greater than the number of depicted components. This is especially the case with regard to the number of depicted devices 22, 24, and 26. Indeed, in an industrial environment, the number of devices may number in the hundreds for the industrial process control system 10. The HMI 14, MES 16, DCS 17, and/or SCADA 18 may employ color techniques, as further described below, to control the presentation of operational information related to the devices 22, 24, and/or 26, as well as to control access to the devices 22, 24, and/or 26. By visualizing and comparing color information, the techniques described herein may more efficiently, safely, and reliably control access and operation of the devices 22, 24, and/or 26, and control access and modifications to the data (e.g., configuration data, programming data, firmware data) related to the devices 22, 24 and/or 26. While color-coded control is described below, similar techniques may be used to employ other graphical representation as well.

Figure 2:
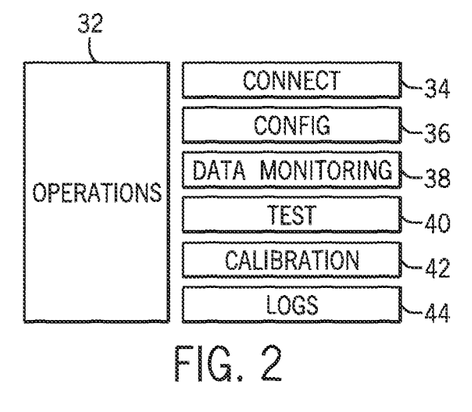
FIG. 2 is a schematic diagram of possible organization for operations in the industrial control system of FIG. 1.

FIG. 2 is a schematic diagram of an embodiment of possible operations in the industrial process control system 10 of FIG. 1. The operations 32 include data for setting up or otherwise configuring each device including registers included in the device, as well as executable content (e.g., computer instructions) that can be executed by the device. The operations 32 may be selected by a user at the computer 12 of the industrial control system 10. Selection of organized groups of the operations 32 may be done by selecting an illustrated control button that corresponds to the organized group as described below. Some devices may include a processor within the device, and the operations 32 include content that is executable by the processor as well. For example, the device D1 22 may be programmed to monitor a flow rate and to configure parameters that ensure an accurate reading of the flow rate. The user interface of the computer 12 may organize the operations 32 into various categories, such as those illustrated in FIG. 2. The operations 32 in each category may be differentiated by using different colors based on a modification privilege as explained below. For example, connect operations 34 (e.g., communicative coupling operations) may contain some or all of the operations monitoring and controlling the communicative coupling of the device (e.g., D1 22, D2 24, $D_N$ 26) to the communication bus 20. The connect operations 34 for the devices (e.g., D1 22, D2 24, $D_N$ 26) may also monitor the communicative coupling of the bus to the PLCs 28 and 30, in which case those operations would show up when a user activated the connect operations 34. Communicative coupling operations 34 include connection type, communication port and node, and connection parameters (e.g., baud rate, parity, data bits, stop bits, and so on). The option to select each of these operations may be provided, for example, by a drop down menu or selectable list. A selection of one of the options in the drop down menu may establish exclusive communication with the selected device (e.g., devices D1 22, D2 24, $D_N$ 26), in which case the connect operations 34 would change to disconnect operations in the user interface. Selecting disconnect operations releases (i.e., disconnects) the communicative coupling between the device and the processor.

The configuration operations 36 enable user to view and/or edit configuration parameters associated with the device (e.g., D1 22, D2 24, $D_N$ 26). Configuration parameters include all the variables, register parameters, and/or settings useful for operating the device (e.g., D1 22, D2 24, $D_N$ 26) in a specific environment (e.g., industrial plant). As described below, the parameters may appear in a list organized, for example, by color (as described above, other graphical representation may be used as well). The organization of the list may be based on a modification privilege and/or a specified authorization level of the user of the computer 12. From the configuration menu, an operator may be able to edit the configuration parameters depending on credentials. The color-specific user profile may correspond to a red, yellow, green, blue, orange, purple, or other color-specific user profile. Furthermore, each color-specific user profile may encompass one or more color-based profiles or privileges based on one or more color-based overlapping relationships, hierarchical relationships, diagrammatical relationships, or any combination thereof. For example, an operator may sign in under a color-specific user profile and be able to view and edit the color-specific configuration parameters. For example, a yellow user profile may encompass other color profiles as described below with respect to FIG. 4. Any number of colors may be used for user profiles, and the colors may provide access based on a hierarchical structure where the higher level color incorporates access of the lower colors, as well as a Venn diagram structure enabling color union, intersection, relative complement, symmetric complement, and absolute complement, as described below.

Data monitoring operations 38 enable a user or operator to view and/or log real-time measurements of the device (e.g., D1 22, D2 24, $D_N$ 26). The measurements may again be organized by color and accessed only by an operator signed in under a specific color. Test operations 40 may enable a user to view a list of tests that the device (e.g., D1 22, D2 24, $D_N$ 26) may execute, including equipment diagnostics tests and equipment status tests. The tests may include tests to monitor the device to make sure it is running properly, or may include tests on a parameter that the device is monitoring. Each of these tests may be categorized by a different color, or the tests may be categorized based on the burden that the test may place on the system. For example, tests that require resources to be diverted from other parts of the system may be designated with a color that uses higher credentials to access. As an example, Red may be used to designate resource-intensive tests, while green may be used to designate test using very little resources.

The system 10 may also include calibration operations 42, such as operations that list and manipulate the calibration settings and calibration tests for the device (e.g., D1 22, D2 24, $D_N$ 26). The calibration operations 42 may be similar to some other functions, such as the configuration operations 36, but may be used to fine tune the process that the devices (e.g., D1 22, D2 24, $D_N$ 26) are performing The calibration operations 42 may be color-coded to indicate the access level needed to perform the calibration. The system 10 may also include logging operations 44. The logging operations 44 may provide a log list of data that the device (e.g., D1 22, D2 24, $D_N$ 26) has stored or that the computer 12 has stored about the device (e.g., D1 22, D2 24, $D_N$ 26). The logging operations 44 may be configured such that a user logged-in under a certain color of access level may be able to read the values stored in the list, and in order to change the values, a higher color access level may be used. The color coding of the operations 32, or other graphical representations of user privileges, may enable a quicker identification of individual operations 32 as well as the access level used to access the operations 32.

Figure 3:
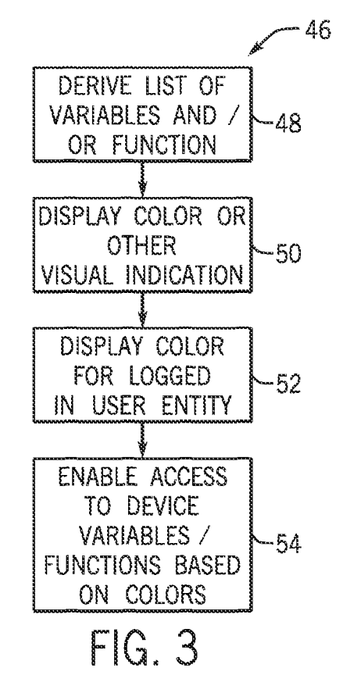
FIG. 3 is a flow chart of an embodiment of a logic suitable for color-coding the operations of the industrial control system of FIG. 1.

FIG. 3 is a flow chart of an embodiment of a logic or process 46 suitable for color-coding (or otherwise graphically representating) the operations of the industrial control system of FIG. 1. The process 46 may be implemented as computer instructions stored in the memories and executable by the processors. The process 46 may be included within the computer 12 of the industrial control system 10. At block 48, the process 46 may derive a list of variables and/or functions that may be performed by or on the device (e.g., D1 22, D2 24, $D_N$ 26). The list that is derived may be, for example, any of the operations 32 described above with respect to FIG. 2 (e.g., connect 34, configuration 36, data monitoring 38, test 40, calibration 42, and logging operations 44). Each item in the list may then be displayed (block 50) with a color or other visual indication (e.g., icon, symbol, graphical art, visual representation, pictorial, or any combination thereof) based on privileges used to access or otherwise change the operations 32 for a given device 22, 24, and/or 26. The color associated with each item in the list may also be derived based on other factors including but not limited to importance as ranked, for example, by the manufacturer, safety impact, operational impact, and so on.

Figure 5:
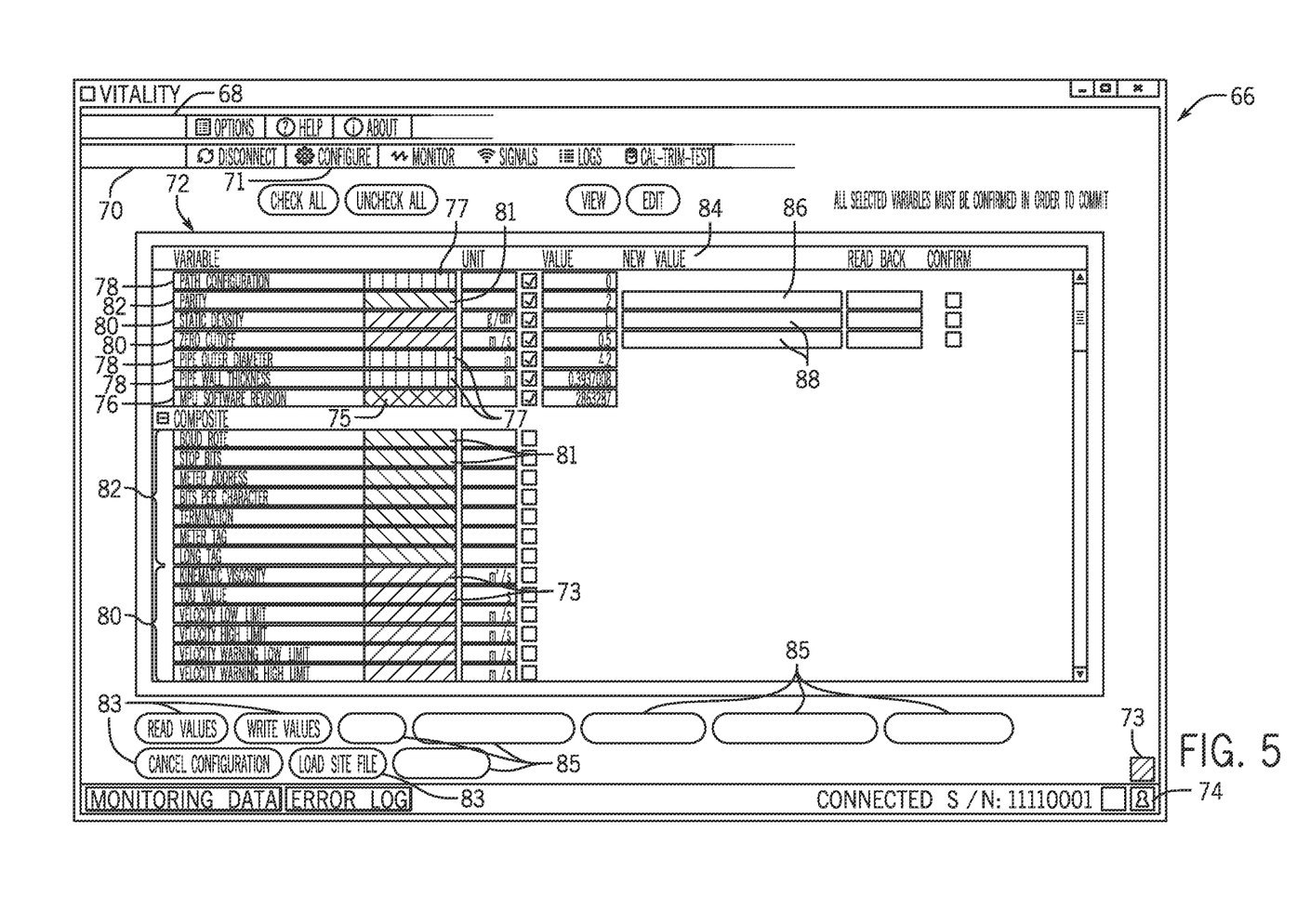
FIG. 5 is an embodiment of a possible user interface of the industrial control system of FIG. 1.
Figure 6:
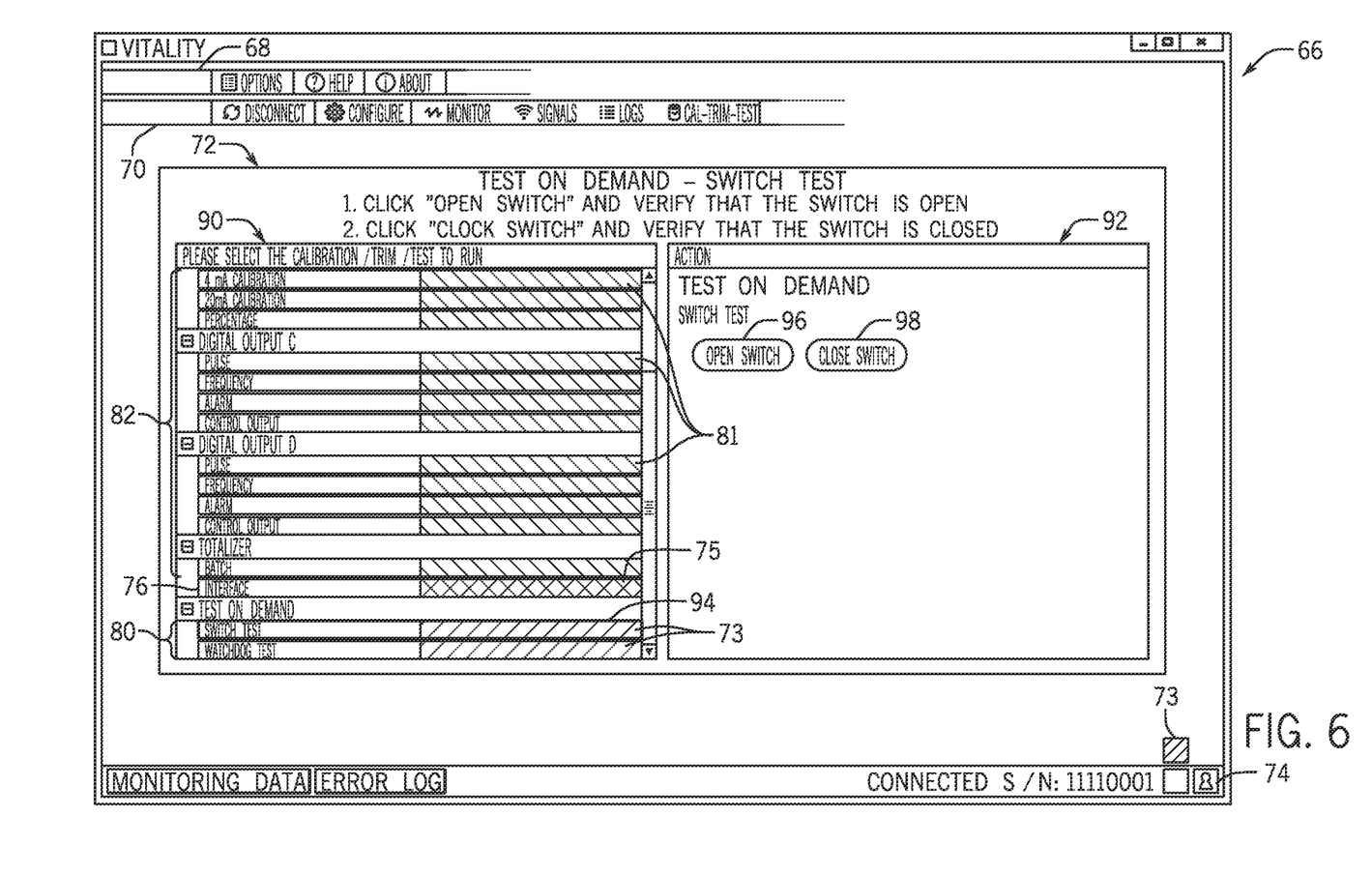
FIG. 6 is an embodiment of a possible user interface of the industrial control system of FIG. 1.

The color and associated privileges may be assigned to the operations 32 with a focus on visual assistance to the user. Viewing the list of operations with assigned colors enables the user entity to quickly identify operations that may be of interest. For example, a user entity may wish to identify operations that are associated with certain equipment configuration, equipment operations, safety operations, and so on. Additionally, the user may wish to identify operations for which, if accidentally executed, the availability of a remedy is low. For example, some operations may involve permanent changes to a device, which would limit the usefulness of the device if made in an undesired way. The colors of the variables in the list may be associated with a color access level. The list may be displayed in any manner of known display methods. For example, the list may be displayed in horizontal rows as shown in FIGS. 5 and 6. In other embodiments, the display of the list may include vertical rows, rows and columns of icons, or any combination thereof.

At block 52, a color is associated with the logged-in user and displayed on a user interface. The user entity may be the operator of the computer 12, a commissioning engineer, a programmer, an operations manager, a safety manager, or any number of human or machine entities. The user may choose a color to log in under at the time of logging in if the user is associated with more than one color, or the user entity may be assigned a color based on a security level, access level, privileges, or any combination thereof. For example, the user entity may use a mouse to click on a button to indicate the desire to log in, after which a drop down menu may show various color options for logging into the system 10. Some colors may ask that a password be provided in order to use that color access level. After logging in, the device may display the user's chosen color in a control (e.g., button, listbox), an area of the screen, an icon, or a combination thereof. In other embodiments, the color for the logged in user may be represented other ways, such as a background panel, a stripe, a ring around the periphery of the computer display, or some other color representation. Additionally, in certain embodiments, the user may be associated with more than one color and all the associated colors may then be displayed on the user interface.

The user may also be assigned a color based on identifying characteristics requested and/or input via the computer. For example, the user entity may be prompted to input a software token, a hardware token, a fingerprint or other biometric identification, a password, or some other security determination technique. Each identifier may be associated with an access level that corresponds to a color (or other graphical representation).

At block 54, the user is enabled access to device operations based on the chosen or assigned color. The operations 32, again, may be a wide variety of executable code that may be executed by the device, or a parameter or variable used to configure the device. A comparison is made between the color of the operation on the list, and the color that the user entity signed in under. Based on this comparison, access may be granted or denied to certain operations. In certain embodiments, the color (with associated privileges/restrictions) may restrict the operations that the user entity may visualize. For example, a user entity that logs in under a Yellow access level may not be able to see operations that have been designated as Red. Similarly, access to the execution of certain operations may be restricted based on color-based security levels. That is, a user entity may be able to view results for a certain operation without being able to execute that operation (e.g., view the results of a test but not be able to run the test, view calibration settings but not be able to change them). It is to be noted that the user, may in some embodiments, include a software and/or hardware entity.

Figure 4:
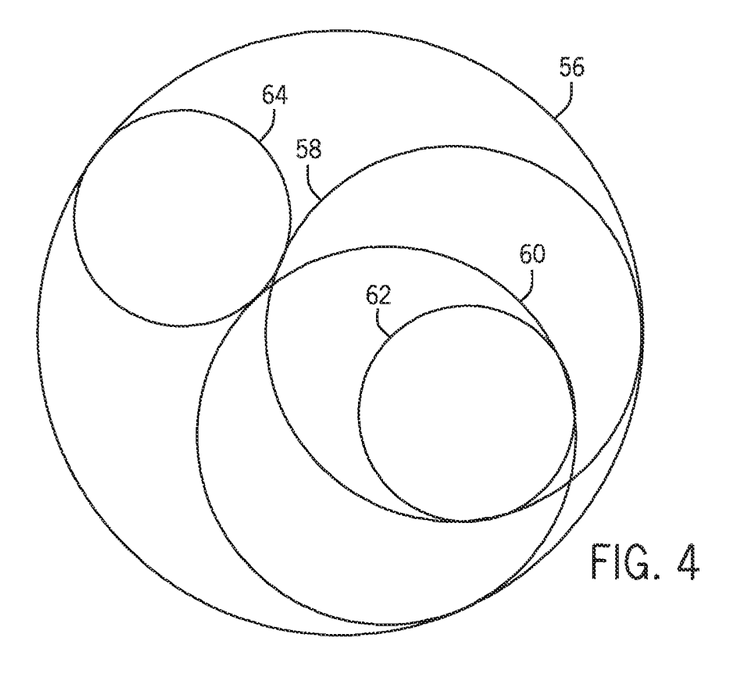
FIG. 4 is a Venn diagram of possible hierarchy options for the operations of the industrial control system of FIG. 1.

FIG. 4 is a Venn diagram embodiment of possible options for the use of color-coded operations of the industrial control system of FIG. 1. Each circle in the Venn diagram may represent a color-based access to the operations that are available to different color access levels. A first circle 56 may represent an access level that is able to view and execute operations of all colors listed in the industrial control system. The circle 56 may represent an administrative responsibility or similar access level. For example, the largest circle 56 may represent a Red access level. A second circle 58 may represent access of a different color access level that is restricted to a subset of operations. As described above, the circle 58 may represent that the color access level is restricted to only being able to view some of the operations, or that the color access level is restricted in the number of operations that may be executable while logged in under that color. A third circle 60 may represent that color access levels may include access to different subsets of operations. As illustrated, color access levels may include access to some of the same operations (e.g., the intersect area where the second circle 58 and the third circle 60 overlap), and may include access to different operations (e.g., the areas of the circles 58, 60 that do not overlap). A fourth circle 62 may represent that there may be a hierarchy of colors (i.e., fourth circle 62 is encompassed completely by the second circle 58 or the third circle 60, which are both encompassed by the first large circle 56). In some embodiments, the division of the colors may include only a hierarchy of colors. In these embodiments, each color access level has access to all the operations that are the same color, or that are a color lower in priority. FIG. 4 also shows a fifth circle 64 that illustrates that a color access level may give access to operations that are restricted from the rest of the hierarchy of color access levels (i.e., circles 58, 60, 62). The Venn diagram of FIG. 4 may be used to support intersection operations where only colors in the intersection of 58 and 60 are allowed access, union operations where only colors in the union are allowed access, relative complement (e.g., set-theoretic difference $B \backslash A = \{x \in B | x \notin A\}$ where only colors in set B but not set A are allowed access, symmetric difference, where only colors not in the intersection of sets A and B are allowed access, and absolute complement, where colors not in a set A are allowed access).

FIG. 5 is an embodiment of a possible graphical user interface of the industrial control system 10 of FIG. 1. The user interface includes a display 66 through which the user may interact with the software components of the industrial control system 10. The display 66 includes a menu bar 68 and an operations bar 70. The operations bar 70 includes certain options for display of the operations 32 as discussed with respect to FIG. 2 above. As illustrated, the operations bar 70 has a configuration menu 71 selected. The display 66 also includes a list window 72 where some of the operations 32 are listed for visualization by the user. The operations 32 may be listed as a bar within the list window 72, the bar being color coded based on the operation that is listed therein. The display 66 also includes a user access button 74. The user access button 74 enables the user to choose a color from among the different colors assigned to the user. After activation of the user access button 74, the display may show a drop-down list of colors, thereby enabling the user entity to select or otherwise access one or more of the listed colors. In some embodiments, upon selection of the button 74, the industrial control system 10 may prompt the user to input a password or provide some other form of identification. In the illustrated embodiment, the user has logged in under a Green 73 access level. The Green 73 access level in the illustrated embodiment allows the user entity to view Red 75 operations 76 and Yellow 77 operations 78, and to edit Green 73 operations 80 and Blue 81 operations 82. Since the user is allowed to edit the Green 73 operations 80 and Blue 81 operations 82, the area under the "New Value" header 84 contains either a drop box 86, or an input box 88. The drop down box 86 may contain a list of options for a particular operation, such as the available settings for the "Parity" operation of the accessed device. The input box 88 may accept a user designated setting that may be input with a device such as a keyboard.

Certain controls, such as buttons 83, may become enabled if the user is associated or has selected a certain color, such as the color green 73. Likewise, other controls, such as the buttons 85, may become disabled (e.g., grayed out) based on the user's color. Likewise, certain portions of the display 66 may become enabled or disabled, and certain controls may appear or disappear based on the use of color, as described in more detail below with respect to FIG. 6.

FIG. 6 is an embodiment of a graphical user interface of the industrial control system 10 of FIG. 1. The user interface shows the display 66 with the test operations 40 activated on the operations bar 70. The list window 72 is split into a left list window 90 (i.e., a first display area) and the right application window 92 (i.e., a second display area). The right application window 92 may appear or disappear based on the use of color. That is, when a user entity has logged in under a certain color, the right application window 92 will open and allow editing of the operations. When a user entity has logged in under a different color, the right application window 92 will not open, and will not allow the user entity to edit the operations. The left window 90 contains a list of all the tests that may be run on the device. As shown by the user access button 74, the user is logged in under the Green 73 access level. Thus, the Green tests 80 in the list are shown as accessible. Also, the Blue tests 82 are accessible to a Green access level in the illustrated embodiment. The Red test 76 shown in the left window 90 is not accessible, however, and is thus grayed out. The right window 92 contains the test options for the selected test bar 94. In the illustrated embodiment, the selected test bar 94 is the switch test bar. The switch test has two options: open switch 96 and close switch 98. These options (i.e., 96 and 98) are examples of possible tests that may be executed, for example, by the devices 22, 24, and/or 26 and do not constitute the number or type of all possible tests that the user might run in the industrial control system 10.

Figure 7:
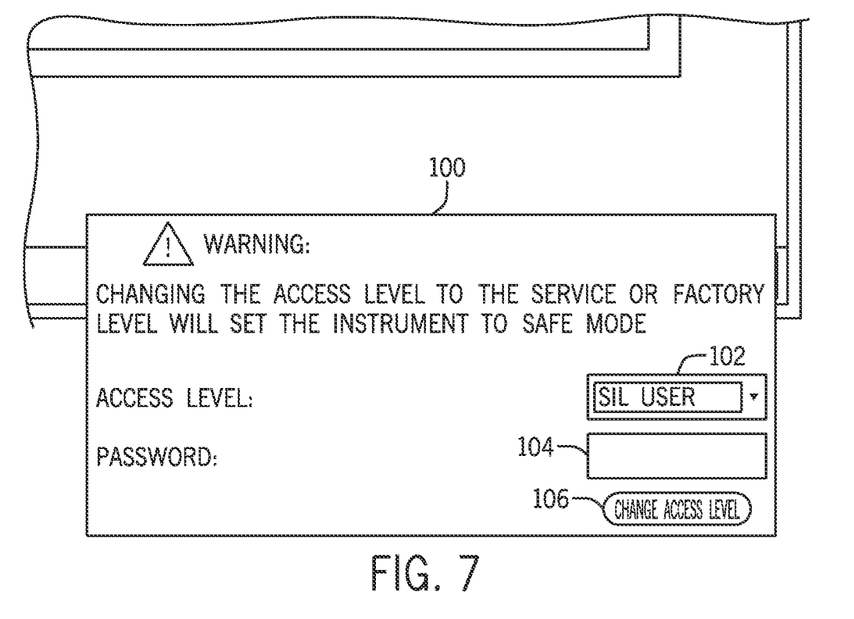
FIG. 7 is an embodiment of a possible log-in user interface of the industrial control system of FIG. 1.

FIG. 7 is an embodiment of a user access interface 100 of the industrial control system 10 of FIG. 1. The user access interface 100 may be activated when the user activates the user access button 74 shown in FIGS. 5 and 6. The user access interface 100 includes a color access level selection menu 102 that the user may use to select a desired color access level. As described above, the color access level may determine the operations that are shown or accessible to the user entity. For example, the color selected may be compared, using a color hierarchy, a Venn diagram, or a combination thereof, to colors associated with the operations 32. The selection menu 102 may contain a list of possible color access levels (e.g., drop-down box), or may contain a value accepting field (e.g., a text box) whereby the user entity may enter a value or a username. Selecting or inputting certain color access levels may initiate the log-in user interface 100 to include a second field 104 into which a user entity may enter a password. As described above, this step may not be used for some color access levels, or may be replaced by some other forms of identification (e.g., key, biometric identification, or combination of these). Once the correct identification is communicated, the user entity may activate the change access level button 106, which causes the user entity to be logged-in under a new color access level. By employing colors to represent certain operations 32, and by comparing colors to gain access to the operations 32, the techniques described herein provide for improved efficiency, safety, and reliability in graphical user interfaces and industrial control environments.

Technical effects of the invention include providing a list of operations on a display that may be differentiated by color. The color may be based on a modification privilege associated with a logged-in user entity. Each operation is thus assigned a color which is compared to the color associated with the currently logged-in color access level. The result of some color comparisons may allow the execution of the operation, while other color comparisons may not allow the execution and/or the viewing of the operation. Differentiating the operations in this manner may enable a user to more quickly and accurately execute operations without accidentally executing an unintended operation. The user will more quickly identify the operations based on the assigned color, and may be able to quickly understand the current access level based on the color of a log-in area.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A non-transitory computer readable medium storing instructions configured to:
commission a device;
retrieve a first list of operations for the device comprising a sensor, an actuator, or a combination thereof, included in a control system; and
display a first color for each operation in the first list of operations indicative of a modification privilege related to the respective operation, wherein the device comprises a sensor, an actuator, or a combination thereof; wherein the device is communicatively coupled to a processor executing the instructions and the device is configured to execute the operations commissioned by the processor, and wherein the device comprises a Modbus device, a Foundation Fieldbus device, a HART device, or a combination thereof.

2. The computer readable medium of claim 1, comprising instructions configured to derive a second color indicative of a user account associated with the device, and display the second color on a display.

3. The computer readable medium of claim 2, comprising instructions configured to modify a value of at least one operation in the first list of operations indicative of a comparison between the first color and the second color.

4. The computer readable medium of claim 3, wherein the instructions configured to modify the value of the at least operation comprise instructions configured to compare the first color to the second color by using a hierarchy of colors.

5. The computer readable medium of claim 3, wherein the instructions configured to modify the value of the at least one operation comprise instructions configured to compare the first color to the second color using a Venn diagram.

6. The computer readable medium of claim 3, comprising instructions configured to activate a first control, deactivate a second control, add a third control, activate a first display area, deactivate a second display area, or a combination thereof, based on the comparison between the first color and the second color.

7. The computer readable medium of claim 2, comprising instructions configured to enable access to the user account via a password, a biometric identifier, a software token, a hardware token, or any combination thereof.

8. The computer readable medium of claim 1, wherein the modification privilege related to the operation is based on a manufacturer recommendation, a user access level, a ranking of importance of the operation, a safety ranking of the operation, or any combination thereof.

9. The computer readable medium of claim 1, wherein the list of operations include configuration operations, data monitoring operations, test operations, calibration operations, log operations, or a combination thereof.

10. The computer readable medium of claim 1, wherein the device comprises a flow meter, a valve, a pump, or any combination thereof, communicatively coupled to a power generation system.

11. A method comprising:
commissioning a device;
retrieving a first list of operations for the device; and
displaying a first color for each operation in the first list of operations indicative of a modification privilege related to the respective operation, wherein the device comprises a sensor, an actuator, or a combination thereof, included in a control system, wherein the device comprises a sensor, an actuator, or a combination thereof; wherein the device is communicatively coupled to a processor configured to execute the method, and the device is configured to execute the operations commissioned by the processor, and wherein the device comprises a Modbus device, a Foundation Fieldbus device, a HART device, or a combination thereof.

12. The method of claim 11, comprising deriving a second color indicative of a user account associated with the device, and displaying the second color on a display.

13. The method of claim 12, comprising modifying a value of at least one operation in the first list of operations based on a comparison between the first color and the second color.

14. The method of claim 13, wherein modifying the value of the at least one operation comprises comparing the first color to the second color using a Venn diagram.

15. The method of claim 13, wherein modifying the value of the at least one operation comprises comparing the first color to the second color by using a hierarchy of colors.

16. The method of claim 15, comprising activating a first control, deactivating a second control, adding a third control, activating a first display area, deactivating a second display area, or a combination thereof, based on comparing the first color to the second color.

17. A system comprising:
a processor configured to:
commission a device;
derive a first list of operations for the device; and
display a first color indicative of a modification privilege associated with every operation in the first list, wherein the device comprises a sensor, an actuator, or a combination thereof; and
the device communicatively coupled to the processor and configured to execute the operations commissioned by the processor, wherein the device comprises a Modbus device, a Foundation Fieldbus device, a HART device, or a combination thereof.

18. The system of claim 17, wherein the device comprises a flow meter, a valve, a pump, a turbine, or combination thereof.

* * * * *